Jan. 6, 1970          J. D. PERKINS          3,487,808
DEVICES FOR INDICATING THE FLOW OF A LIQUID THROUGH A PIPE
Filed Sept. 5, 1968
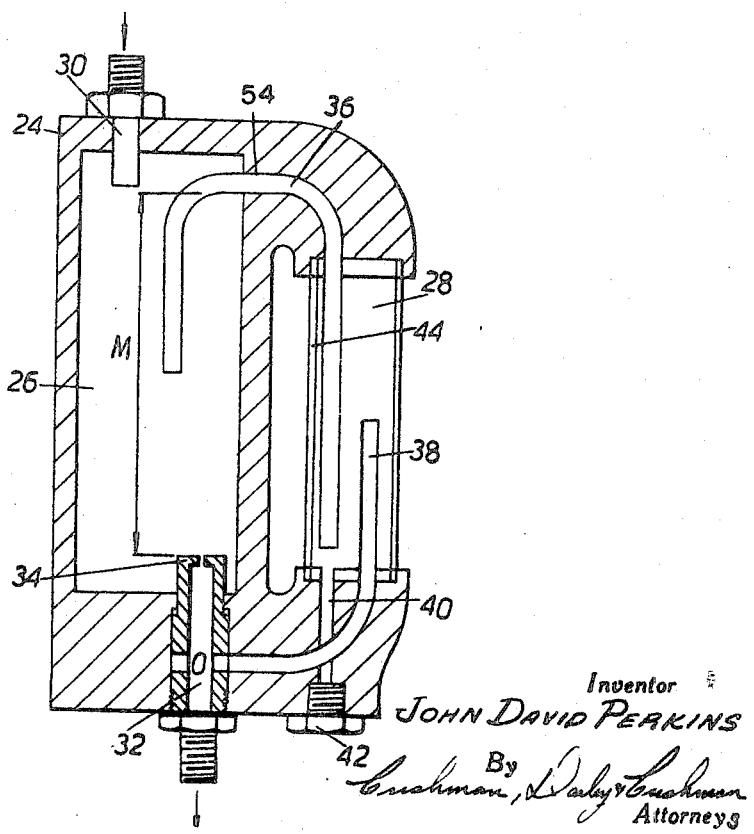
Inventor
JOHN DAVID PERKINS
By Cushman, Darby & Cushman
Attorneys United States Patent Office 3,487,808
Patented Jan. 6, 1970

1

3,487,808
DEVICES FOR INDICATING THE FLOW
OF A LIQUID THROUGH A PIPE
John D. Perkins, Aston on Trent, England, assignor
to Rolls-Royce Limited, Derby, England, a British
company
Filed Sept. 5, 1968, Ser. No. 757,560
Claims priority, application Great Britain, Sept. 6, 1967,
40,658/67
Int. Cl. G01f 1/00, 15/06
U.S. Cl. 116—117                                    4 Claims

ABSTRACT OF THE DISCLOSURE

This invention relates to liquid flow indicating devices for indicating leakage of liquids from gas turbine engine components. One device, suitable for use with components which are normally permitted no leakage, comprises a transparent container connected to receive and trap the leakage, while the other device, suitable for use with components which are permitted a slight leakage, comprises restricting means and a transparent walled container arranged so that liquid enters the container only when the leakage exceeds a predetermined limit.

---

This invention relates to devices for indicating the flow of a liquid through a pipe.

According to the present invention a liquid flow indicating device comprises a container having an inlet which is adapted to be connected to receive the liquid, means adapted to indicate the presence of liquid in the container and an outlet which is adapted to permit liquid in the container to escape therefrom when the volume of liquid therein exceeds a predetermined value.

The device may include liquid flow restricting means, adapted to receive the liquid, the inlet to the container being connected to the flow restricting means in such a manner that the liquid is permitted to enter the container only when the rate of flow of the liquid exceeds a predetermined value.

The liquid flow restricting means preferably comprises a collection chamber having an inlet which is adapted to be connected to receive the liquid, a first outlet having a flow restricting orifice, and a second outlet which is adapted to permit liquid to escape from the collection chamber when the volume of liquid therein exceeds a predetermined value and which is connected to the inlet of the container.

An embodiment of the invention will now be described by way of example only with reference to the accompanying drawings in which the figure is a cross-sectional view of a preferred embodiment for indicating when the liquid leakage flow rate exceeds a predetermined value.

The indicator is particularly suitable for aircraft engine drainage systems. Some components of an aircraft engine are permitted a small continuous leak whilst no leakage is permitted from other components. The indicator illustrated in the figure is adapted to indicate excess leakage of fuel from components which are permitted a small continuous leak.

The indicator illustrated in the figure comprises a body 24 in which there are formed a collection chamber 26 and a sight glass chamber 28. The collection chamber 26 has an inlet pipe 30 and an outlet pipe 32 and over the outlet orifice in the base of the collection chamber 26 is located a removable restrictor orifice 34. A transfer tube 36 leads from approximately the centre of the collection chamber 26 into the sight glass chamber 28 and terminates adjacent to the base of the sight glass chamber. The sight glass chamber is also provided with an outlet pipe 38 which leads from approximately the centre of the sight glass chamber and is connected to the outlet pipe 32 from the collection chamber 26. The sight glass chamber walls 44 are formed from transparent material and the base of the sight glass chamber is provided with a drain passage 40 which is sealed by a removable plug 42.

In this case the indicator is connected to an accessory which is permitted a predetermined rate of leakage. Thus fuel enters the collecting chamber 26 via the inlet pipe 30 and collects in the base of the chamber. At normal or less than normal rates of leakage, the fuel drains from the chamber 26 through the restrictor orifice 34 and out through the outlet pipe 32. The restrictor orifice is adapted to pass fuel at a flow rate equal to the maximum permissible leakage rate of the accessory to which the indicator is connected, for example, for an accessory having a maximum permissible leakage rate, the restrictor would be adapted to flow at that rate at a maximum head of ½ M, where M is the distance from the top of the restrictor orifice 34 to the bottom of the horizontal portion 54 of the transfer tube 36. This would ensure that fuel could flow at its maximum permissible rate into the collection chamber 26 wihout the chamber becoming more than half full.

When a seal, gland or other part of the accessory fails causing a considerable increase in the rate of leakage of fuel, the volume of fuel in the collection chamber 26 increases since the increase in the rate of flow of liquid through the restrictor orifice 34 is less than the increase in the rate of leakage. When the level of the fuel reaches the horizontal portion 44 of the transfer tube 36, the fuel will spill over into the sight glass chamber 28 and the volume of fuel in the sight glass chamber will then increase until the surface of the fuel reaches the level of the outlet pipe 38. The excess leakage flow will then pass into the outlet pipe 32 and out of the indicator.

Thus the presence of any fuel in the sight glass chamber indicates that there has been excessive leakage from the accessory.

If the aircraft should fly inverted for a period of time, the fuel remaining in the collection chamber 26 will run to the top of the chamber, but cannot escape into the sight glass chamber as the end of the transfer tube 36 is at the centre of the chamber 26. Similarly any fuel remaining in the sight glass chamber cannot return into the collection chamber as the other end of the transfer tube is adjacent to the base of the sight glass chamber. Thus the possibility of an incorrect indication due to inverted flight of the aircraft is avoided.

I claim:
1. A device for indicating the occurrence of a liquid flow rate exceeding a predetermined value comprising a means defining a first chamber, an inlet means communicating with an external source of liquid for conducting liquid therefrom into said first chamber, an outlet means for conducting liquid from said first chamber to a means external of said device, said outlet means including restrictor means defining an orifice for restricting the flow of liquid through said outlet means to a rate equal to or less than said predetermined value forming a head of a predetermined maximum height, a second chamber having means for permitting the determination of the presence of liquid therein, first conduit means communicating with said first chamber and said second chamber, said first conduit entering said first chamber at a point a distance above said restrictor orifice such that when the liquid level in said first chamber exceeds said predetermined head, liquid will flow through said first conduit into said second chamber, and second conduit means extending into said second chamber communicating said second chamber with said outlet means.

2. The device defined in claim 1 wherein said distance from said point of entry of said first conduit into said first chamber to said resistor orifice is twice the height of said predetermined head.

3. The device defined in claim 1 wherein said means for permitting the determination of the presence of liquid in said second chamber comprises a transparent wall of said second chamber.

4. The device defined in claim 1 wherein said first conduit is a U-shaped tube with a first leg thereof extending downwardly substantially to the middle of said first chamber and with the second leg thereof extending downwardly to the lower portion of said second chamber.

References Cited

UNITED STATES PATENTS

| | | | |
|---|---|---|---|
| 2,470,230 | 5/1949 | Andreasen et al. | 116—117 XR |
| 2,655,893 | 10/1953 | Cox et al. | 116—117 XR |

LOUIS J. CAPOZIO, Primary Examiner

U.S. Cl. X.R.

73—216